US007161936B1

(12) United States Patent
Barrass et al.

(10) Patent No.: US 7,161,936 B1
(45) Date of Patent: Jan. 9, 2007

(54) METHOD AND SYSTEM FOR DISTRIBUTING DATA COMMUNICATIONS UTILIZING A CROSSBAR SWITCH

(75) Inventors: Hugh Barrass, Milpitas, CA (US); David A. Schwartz, Palo Alto, CA (US)

(73) Assignee: Cisco Technology, Inc., San Jose, CA (US)

( * ) Notice: Subject to any disclaimer, the term of this patent is extended or adjusted under 35 U.S.C. 154(b) by 956 days.

(21) Appl. No.: 10/035,353

(22) Filed: Dec. 28, 2001

(51) Int. Cl.
*H04L 12/50* (2006.01)
*H04Q 11/50* (2006.01)

(52) U.S. Cl. .................................................. 370/387
(58) Field of Classification Search ................ 370/357, 370/359, 386–388, 351
See application file for complete search history.

(56) References Cited

U.S. PATENT DOCUMENTS

| | | | | |
|---|---|---|---|---|
| 4,173,713 A | * | 11/1979 | Giesken et al. | 370/374 |
| 4,331,956 A | * | 5/1982 | Lovelace et al. | 340/2.26 |
| 4,524,442 A | * | 6/1985 | Simmons et al. | 370/371 |
| 4,611,123 A | * | 9/1986 | McDonald | 250/551 |
| 5,072,366 A | * | 12/1991 | Simcoe | 710/317 |
| 5,341,234 A | * | 8/1994 | Suzuki et al. | 398/51 |
| 6,826,708 B1 | * | 11/2004 | Michalewicz | 714/4 |
| 6,874,041 B1 | * | 3/2005 | Burd et al. | 710/38 |
| 6,970,458 B1 | * | 11/2005 | Lim | 370/387 |
| 6,990,095 B1 | * | 1/2006 | Wu et al. | 370/367 |

* cited by examiner

*Primary Examiner*—Hassan Kizou
*Assistant Examiner*—Kerri M. Rose
(74) *Attorney, Agent, or Firm*—Baker Botts L.L.P.

(57) ABSTRACT

A solid-state crossbar switch for transmitting data traffic includes a first number of input ports. Each input port is operable to receive DSL data from a data switch. The crossbar switch also includes a second number of output ports. Each output port is capable of being coupled to a customer premise equipment (CPE) device. The crossbar switch includes a third number of 1×N solid-state analog switches. Each 1×N solid-state analog switch is operable to couple one of the input ports with N output ports. Each input port may be coupled to one of the analog switches. The second number of output ports may be greater than N. The crossbar switch may include a sweeper port coupled to each output port. The sweeper port is operable to monitor each output port to detect an active connection of a CPE device to one of the output ports.

46 Claims, 9 Drawing Sheets

| INPUT PORT | 1001 | 1002 | 1003 | 1004 | 1005 | 1006 | 1007 | 1008 | 1009 | 1010 | 1011 | 1012 | 1013 | 1014 | 1015 | 1016 | 1017 | 1018 | 1019 | 1020 | 1021 | 1022 | 1023 | 1024 |
|---|---|---|---|---|---|---|---|---|---|---|---|---|---|---|---|---|---|---|---|---|---|---|---|---|
| 201 | x | | | | | | | | | | | | | | | | | | | | | | | |
| 202 | x | x | | | | | | | | | | | | | | | | | | | | | | |
| 203 | x | x | | | | | | | | | | | | | | | | | | | | | | |
| 204 | x | x | x | | | | | | | | | | | | | | | | | | | | | |
| 205 | x | x | x | | | | | | | | | | | | | | | | | | | | | |
| 206 | x | x | x | | | | | | | | | | | | | | | | | | | | | |
| 207 | x | x | x | x | | | | | | | | | | | | | | | | | | | | |
| 208 | x | x | x | x | | | | | | | | | | | | | | | | | | | | |
| 209 | x | x | x | x | | | | | | | | | | | | | | | | | | | | |
| 210 | x | x | x | x | | | | | | | | | | | | | | | | | | | | |
| 211 | x | x | x | x | x | | | | | | | | | | | | | | | | | | | |
| 212 | x | x | x | x | x | | | | | | | | | | | | | | | | | | | |
| 213 | x | x | x | x | x | | | | | | | | | | | | | | | | | | | |
| 214 | x | x | x | x | x | | | | | | | | | | | | | | | | | | | |
| 215 | x | x | x | x | x | x | | | | | | | | | | | | | | | | | | |
| 216 | x | x | x | x | x | x | | | | | | | | | | | | | | | | | | |
| 217 | | x | x | x | x | x | | | | | | | | | | | | | | | | | | |
| 218 | | x | x | x | x | | | | | | | | | | | | | | | | | | | |
| 219 | | x | x | x | x | x | | | | | | | | | | | | | | | | | | |
| 220 | | | x | x | x | x | | | | | | | | | | | | | | | | | | |
| 221 | | | x | x | x | x | | | | | | | | | | | | | | | | | | |
| 222 | | | x | x | x | x | | | | | | | | | | | | | | | | | | |
| 223 | | | | x | x | x | x | | | | | | | | | | | | | | | | | |
| 224 | | | | x | x | x | x | | | | | | | | | | | | | | | | | |
| 225 | | | | x | x | x | x | | | | | | | | | | | | | | | | | |
| 226 | | | | x | x | x | x | | | | | | | | | | | | | | | | | |
| 227 | | | | | x | x | x | x | | | | | | | | | | | | | | | | |
| 228 | | | | | x | x | x | x | | | | | | | | | | | | | | | | |
| 229 | | | | | x | x | x | x | | | | | | | | | | | | | | | | |
| 230 | | | | | x | x | x | x | | | | | | | | | | | | | | | | |
| 231 | | | | | | x | x | x | x | | | | | | | | | | | | | | | |
| 232 | | | | | | x | x | x | x | | | | | | | | | | | | | | | |
| 233 | | | | | | x | x | x | x | | | | | | | | | | | | | | | |
| 234 | | | | | | x | x | x | x | | | | | | | | | | | | | | | |

OUTPUT PORT

FROM FIG. 3A

| Output Port | Columns (X positions) |
|---|---|
| 235 | X X X X at cols 5–8 |
| 236 | X X X X at cols 5–8 |
| 237 | X X X X at cols 5–8 |
| 238 | X X X X at cols 5–8 |
| 239 | X X X X at cols 6–9 |
| 240 | X X X X at cols 6–9 |
| 241 | X X X X at cols 6–9 |
| 242 | X X X X at cols 6–9 |
| 243 | X X X X at cols 7–10 |
| 244 | X X X X at cols 7–10 |
| 245 | X X X X at cols 7–10 |
| 246 | X X X X at cols 7–10 |
| 247 | X X X X at cols 8–11 |
| 248 | X X X X at cols 8–11 |
| 249 | X X X at cols 8–10 |
| 250 | X X X at cols 8–10 |
| 251 | X X X X at cols 8–11 |
| 252 | X X X X at cols 8–11 |
| 253 | X X X X at cols 8–11 |
| 254 | X X X X at cols 8–11 |
| 255 | X X X X at cols 9–12 |
| 256 | X X X X at cols 9–12 |
| 257 | X X X X at cols 9–12 |
| 258 | X X X X at cols 9–12 |
| 259 | X X X X at cols 9–12 |
| 260 | X X X X at cols 9–12 |
| 261 | X X X X at cols 9–12 |
| 262 | X X X X at cols 9–12 |
| 263 | X X X X at cols 10–13 |
| 264 | X X X X at cols 10–13 |
| 265 | X X X X at cols 10–13 |
| 266 | X X X X at cols 10–13 |
| 267 | X X X X at cols 10–13 |
| 268 | X X X X at cols 10–13 |
| 269 | X X X X at cols 10–13 |

TO FIG. 3C

FIG. 3C
FROM FIG. 3B

FIG. 4A

| INPUT PORT | 3301 | 3302 | 3303 | 3304 | 3305 | 3306 | 3307 | 3308 | 3309 | 3310 | 3311 | 3312 | 3313 | 3314 | 3315 | 3316 | 3317 | 3318 | 3319 | 3320 | 3321 | 3322 | SWEEPER | CATCHER |
|---|---|---|---|---|---|---|---|---|---|---|---|---|---|---|---|---|---|---|---|---|---|---|---|---|
| 401 | X |   |   |   |   |   |   |   |   |   |   |   |   |   |   |   |   |   |   |   |   |   | s | c |
| 402 | X | X |   |   |   |   |   |   |   |   |   |   |   |   |   |   |   |   |   |   |   |   | s | c |
| 403 | X | X |   |   |   |   |   |   |   |   |   |   |   |   |   |   |   |   |   |   |   |   | s | c |
| 404 | X | X | X |   |   |   |   |   |   |   |   |   |   |   |   |   |   |   |   |   |   |   | s | c |
| 405 | X | X | X |   |   |   |   |   |   |   |   |   |   |   |   |   |   |   |   |   |   |   | s | c |
| 406 | X | X | X |   |   |   |   |   |   |   |   |   |   |   |   |   |   |   |   |   |   |   | s | c |
| 407 | X | X | X | X |   |   |   |   |   |   |   |   |   |   |   |   |   |   |   |   |   |   | s | c |
| 408 | X | X | X | X |   |   |   |   |   |   |   |   |   |   |   |   |   |   |   |   |   |   | s | c |
| 409 | X | X | X | X |   |   |   |   |   |   |   |   |   |   |   |   |   |   |   |   |   |   | s | c |
| 410 | X | X | X | X |   |   |   |   |   |   |   |   |   |   |   |   |   |   |   |   |   |   | s | c |
| 411 | X | X | X | X | X |   |   |   |   |   |   |   |   |   |   |   |   |   |   |   |   |   | s | c |
| 412 | X | X | X | X | X |   |   |   |   |   |   |   |   |   |   |   |   |   |   |   |   |   | s | c |
| 413 | X | X | X | X | X |   |   |   |   |   |   |   |   |   |   |   |   |   |   |   |   |   | s | c |
| 414 | X | X | X | X | X |   |   |   |   |   |   |   |   |   |   |   |   |   |   |   |   |   | s | c |
| 415 | X | X | X | X | X | X |   |   |   |   |   |   |   |   |   |   |   |   |   |   |   |   | s | c |
| 416 | X | X | X | X | X | X |   |   |   |   |   |   |   |   |   |   |   |   |   |   |   |   | s | c |
| 417 |   | X | X | X | X | X |   |   |   |   |   |   |   |   |   |   |   |   |   |   |   |   | s | c |
| 418 |   | X | X | X | X |   |   |   |   |   |   |   |   |   |   |   |   |   |   |   |   |   | s | c |
| 419 |   | X | X | X | X | X | X |   |   |   |   |   |   |   |   |   |   |   |   |   |   |   | s | c |
| 420 |   | X | X | X | X |   |   |   |   |   |   |   |   |   |   |   |   |   |   |   |   |   | s | c |
| 421 |   | X | X | X | X |   |   |   |   |   |   |   |   |   |   |   |   |   |   |   |   |   | s | c |
| 422 |   | X | X | X | X |   |   |   |   |   |   |   |   |   |   |   |   |   |   |   |   |   | s | c |
| 423 |   |   | X | X | X | X |   |   |   |   |   |   |   |   |   |   |   |   |   |   |   |   | s | c |
| 424 |   |   | X | X | X | X |   |   |   |   |   |   |   |   |   |   |   |   |   |   |   |   | s | c |
| 425 |   |   | X | X | X | X |   |   |   |   |   |   |   |   |   |   |   |   |   |   |   |   | s | c |
| 426 |   |   | X | X | X | X |   |   |   |   |   |   |   |   |   |   |   |   |   |   |   |   | s | c |
| 427 |   |   |   | X | X | X |   |   |   |   |   |   |   |   |   |   |   |   |   |   |   |   | s | c |
| 428 |   |   |   | X | X | X | X |   |   |   |   |   |   |   |   |   |   |   |   |   |   |   | s | c |
| 429 |   |   |   | X | X | X | X |   |   |   |   |   |   |   |   |   |   |   |   |   |   |   | s | c |
| 430 |   |   |   | X | X | X | X |   |   |   |   |   |   |   |   |   |   |   |   |   |   |   | s | c |
| 431 |   |   |   |   | X | X | X |   |   |   |   |   |   |   |   |   |   |   |   |   |   |   | s | c |
| 432 |   |   |   |   | X | X | X |   |   |   |   |   |   |   |   |   |   |   |   |   |   |   | s | c |
| 433 |   |   |   |   | X | X | X | X |   |   |   |   |   |   |   |   |   |   |   |   |   |   | s | c |
| 434 |   |   |   |   | X | X | X | X |   |   |   |   |   |   |   |   |   |   |   |   |   |   | s | c |

OUTPUT PORT

FROM FIG. 4A

| OUTPUT PORT | | | | | | | | | | | | | | | | | | | | | S | C |
|---|---|---|---|---|---|---|---|---|---|---|---|---|---|---|---|---|---|---|---|---|---|---|
| 435 | | | | | x | x | x | | | | | | | | | | | | | | s | c |
| 436 | | | | | x | x | x | | | | | | | | | | | | | | s | c |
| 437 | | | | | x | x | x | x | | | | | | | | | | | | | s | c |
| 438 | | | | | x | x | x | x | | | | | | | | | | | | | s | c |
| 439 | | | | | | x | x | x | | | | | | | | | | | | | s | c |
| 440 | | | | | | x | x | x | | | | | | | | | | | | | s | c |
| 441 | | | | | | x | x | x | | | | | | | | | | | | | s | c |
| 442 | | | | | | x | x | x | x | | | | | | | | | | | | s | c |
| 443 | | | | | | x | x | x | x | | | | | | | | | | | | s | c |
| 444 | | | | | | | x | x | x | | | | | | | | | | | | s | c |
| 445 | | | | | | | x | x | x | | | | | | | | | | | | s | c |
| 446 | | | | | | | x | x | x | | | | | | | | | | | | s | c |
| 447 | | | | | | | x | x | x | x | | | | | | | | | | | s | c |
| 448 | | | | | | | x | x | x | x | | | | | | | | | | | s | c |
| 449 | | | | | | | | x | x | x | | | | | | | | | | | s | c |
| 450 | | | | | | | | x | x | x | | | | | | | | | | | s | c |
| 451 | | | | | | | | x | x | x | | | | | | | | | | | s | c |
| 452 | | | | | | | | x | x | x | x | | | | | | | | | | s | c |
| 453 | | | | | | | | x | x | x | x | | | | | | | | | | s | c |
| 454 | | | | | | | | | x | x | x | | | | | | | | | | s | c |
| 455 | | | | | | | | | x | x | x | | | | | | | | | | s | c |
| 456 | | | | | | | | | x | x | x | x | | | | | | | | | s | c |
| 457 | | | | | | | | | x | x | x | x | | | | | | | | | s | c |
| 458 | | | | | | | | | | x | x | x | | | | | | | | | s | c |
| 459 | | | | | | | | | | x | x | x | | | | | | | | | s | c |
| 460 | | | | | | | | | | x | x | x | | | | | | | | | s | c |
| 461 | | | | | | | | | | x | x | x | x | | | | | | | | s | c |
| 462 | | | | | | | | | | x | x | x | x | | | | | | | | s | c |
| 463 | | | | | | | | | | | x | x | x | | | | | | | | s | c |
| 464 | | | | | | | | | | | x | x | x | | | | | | | | s | c |
| 465 | | | | | | | | | | | x | x | x | | | | | | | | s | c |
| 466 | | | | | | | | | | | x | x | x | x | | | | | | | s | c |
| 467 | | | | | | | | | | | x | x | x | x | | | | | | | s | c |
| 468 | | | | | | | | | | | | x | x | x | | | | | | | s | c |
| 469 | | | | | | | | | | | | x | x | x | | | | | | | s | c |

TO FIG. 4C

FIG. 4C
FROM FIG. 4B

| OUTPUT PORT | | | | | | | | | | | | | | | | | | | | |
|---|---|---|---|---|---|---|---|---|---|---|---|---|---|---|---|---|---|---|---|---|
| 470 | | | | | | | | | | X | X | X | | | | | S | C |
| 471 | | | | | | | | | | X | X | X | X | | | | S | C |
| 472 | | | | | | | | | | | X | X | X | | | | S | C |
| 473 | | | | | | | | | | | X | X | X | | | | S | C |
| 474 | | | | | | | | | | | X | X | X | | | | S | C |
| 475 | | | | | | | | | | | X | X | X | X | | | S | C |
| 476 | | | | | | | | | | | X | X | X | X | | | S | C |
| 477 | | | | | | | | | | | | X | X | X | | | S | C |
| 478 | | | | | | | | | | | | X | X | X | X | | S | C |
| 479 | | | | | | | | | | | | X | X | X | X | | S | C |
| 480 | | | | | | | | | | | | X | X | X | X | X | S | C |
| 481 | | | | | | | | | | | | X | X | X | X | X | X | S | C |
| 482 | | | | | | | | | | | | | X | X | X | X | X | S | C |
| 483 | | | | | | | | | | | | | X | X | X | X | X | S | C |
| 484 | | | | | | | | | | | | | X | X | X | X | X | S | C |
| 485 | | | | | | | | | | | | | X | X | X | X | X | S | C |
| 486 | | | | | | | | | | | | | X | X | X | X | X | S | C |
| 487 | | | | | | | | | | | | | | X | X | X | X | S | C |
| 488 | | | | | | | | | | | | | | X | X | X | X | S | C |
| 489 | | | | | | | | | | | | | | X | X | X | X | S | C |
| 490 | | | | | | | | | | | | | | X | X | X | X | S | C |
| 491 | | | | | | | | | | | | | | | X | X | X | S | C |
| 492 | | | | | | | | | | | | | | | X | X | X | S | C |
| 493 | | | | | | | | | | | | | | | X | X | X | S | C |
| 494 | | | | | | | | | | | | | | | | X | X | S | C |
| 495 | | | | | | | | | | | | | | | | X | X | S | C |
| 496 | | | | | | | | | | | | | | | | | X | S | C |

FIG. 5  508

| INPUT PORT | 501 | 502 | 503 | 504 | 505 | 506 | 507 | SWEEPER |
|---|---|---|---|---|---|---|---|---|
| 601 | x | x | x | x | x | x | x | s |
| 602 | x | x | x | x | x | x | x | s |
| 603 | x | x | x | x | x | x | x | s |
| 604 | x | x | x | x | x | x | x | s |
| 605 | x | x | x | x | x | x | x | s |
| 606 | x | x | x | x | x | x | x | s |
| 607 | x | x | x | x | x | x | x | s |
| 608 | x | x | x | x | x | x | x | s |
| 609 | x | x | x | x | x | x | x | s |
| 610 | x | x | x | x | x | x | x | s |
| 611 | x | x | x | x | x | x | x | s |
| 612 | x | x | x | x | x | x | x | s |
| 613 | x | x | x | x | x | x | x | s |
| 614 | x | x | x | x | x | x | x | s |
| 615 | x | x | x | x | x | x | x | s |
| 616 | x | x | x | x | x | x | x | s |
| 617 | x | x | x | x | x | x | x | s |
| 618 | x | x | x | x | x | x | x | s |
| 619 | x | x | x | x | x | x | x | s |
| 620 | x | x | x | x | x | x | x | s |
| 621 | x | x | x | x | x | x | x | s |
| 622 | x | x | x | x | x | x | x | s |
| 623 | x | x | x | x | x | x | x | s |
| 624 | x | x | x | x | x | x | x | s |

OUTPUT PORT

METHOD AND SYSTEM FOR DISTRIBUTING DATA COMMUNICATIONS UTILIZING A CROSSBAR SWITCH

TECHNICAL FIELD OF THE INVENTION

This invention relates in general to the field of data communications and, more particularly, to a system for distributing data communications utilizing a crossbar switch.

BACKGROUND OF THE INVENTION

The growth of the Internet has increased the demand for bandwidth. Digital subscriber line (DSL) technology meets this demand by providing higher bandwidth data service to subscribers. Particular installation of DSL technology uses a crossbar switch to provide a variable connection between a data switch, such as a DSL multiplexer (DSLAM) unit, and the lines connected to the subscribers.

Some conventional methods of providing DSL service utilize relay-based crossbar switches which may have slow switching times and short working lives. For example, the average switching frequency in such switches may be approximately one switch per day. Furthermore, extra manpower may be required to reconfigure the switch each time a new subscriber chooses to subscribe.

SUMMARY OF THE INVENTION

The present invention provides a system for distributing data communications utilizing a crossbar switch that substantially eliminates or reduces at least some of the disadvantages and problems associated with previous systems for distributing data communications.

In accordance with a particular embodiment of the present invention, a solid-state crossbar switch for transmitting data traffic includes a first number of input ports. Each input port is operable to receive DSL data from a data switch. The crossbar switch also includes a second number of output ports. Each output port is capable of being coupled to a customer premise equipment (CPE) device. The crossbar switch includes a third number of 1×N solid-state analog switches. Each 1×N solid-state analog switch is operable to couple one of the input ports with N output ports. Each input port may be coupled to one of the analog switches. The second number of output ports may be greater than N. The crossbar switch may include a sweeper port coupled to each output port. The sweeper port is operable to monitor each output port to detect an active connection of a CPE device to one of the output ports.

In accordance with another embodiment, a method for transmitting DSL data between a data switch and a CPE device using a solid-state crossbar switch includes receiving DSL data from the data switch at a first number of input ports. The method also includes receiving the DSL data from the input ports at a second number of 1×N solid-state analog switches. Each 1×N solid-state analog switch comprises N outlets. The method includes switching the DSL data received at each analog switch to an outlet of each analog switch. The method also includes receiving the switched DSL data at a third number of output ports. Each output port is capable of being coupled to a CPE device.

Technical advantages of particular embodiments of the present invention include a crossbar switch for the provision of data services utilizing solid-state technology. Accordingly, switching times of the crossbar switch may be improved, and its working life may be increased.

Another technical advantage of particular embodiments of the present invention is a crossbar switch in which each input port is not coupled to each output port. Thus, time and expense associated with the manufacturing, installation and operation of the crossbar switch may be reduced since less components may be required to produce the crossbar switch.

Still another technical advantage of particular embodiments of the present invention is a crossbar switch for data services with a sweeper port for detection and self-provisioning of new subscribers to the services. Accordingly, less manual resources may be required each time a new subscriber chooses to subscribe to the data services being provided.

Other technical advantages will be readily apparent to one skilled in the art from the following figures, descriptions and claims. Moreover, while specific advantages have been enumerated above, various embodiments may include all, some or none of the enumerated advantages.

BRIEF DESCRIPTION OF THE DRAWINGS

For a more complete understanding of particular embodiments of the invention and their advantages, reference is now made to the following descriptions, taken in conjunction with the accompanying drawings, in which.

DETAILED DESCRIPTION OF THE INVENTION

Figure 1:
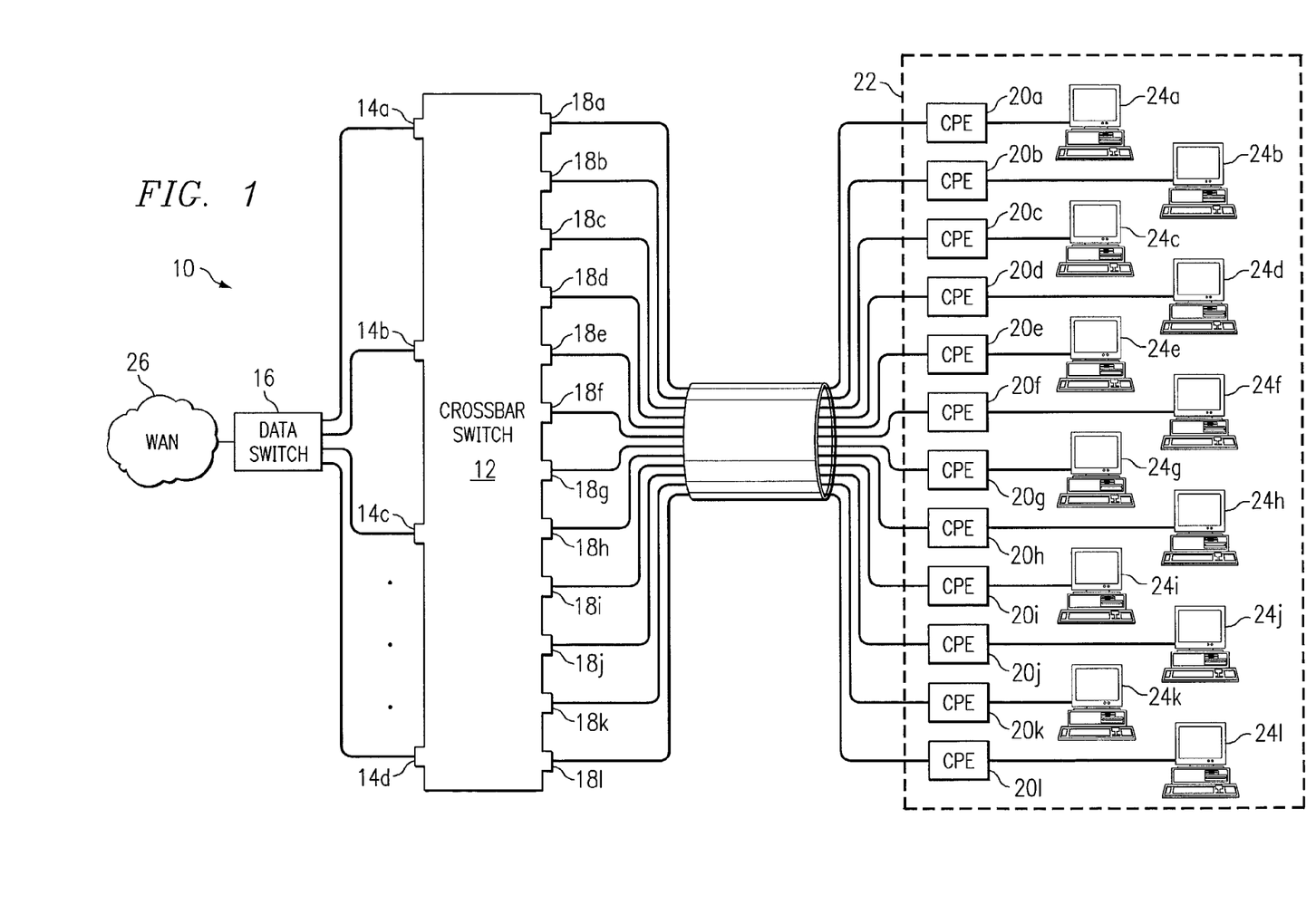
FIG. 1 illustrates a system for providing data services with a crossbar switch, in accordance with an embodiment of the present invention.

FIG. 1 illustrates a system 10 for providing data services, in accordance with an embodiment of the present invention. System 10 may provide data services, such as Long Reach Ethernet (LRE) service, for a subscriber community 22, which may include one or more businesses, apartment complexes or other communities in which subscribers share communications infrastructure or resources, such as a crossbar switch 12. Each subscriber in subscriber community 22 may access data services using one or more associated personal computers (PCs) 24, as illustrated, or other suitable devices, such as telephones or televisions, for interfacing with a data network, such as wide area network (WAN) 26.

System 10 includes a solid-state crossbar switch 12 which couples a data switch 16 with customer premises equipment (CPE) devices 20. Data switch 16 is linked to WAN 26 and may be a DSLAM unit or other device for routing or aggregating data traffic communicated between WAN 26 and PCs 24. For purposes of this specification, "data" includes any audio, video, multimedia, telecommunication signals or other type of data or other wideband or broadband calls, traffic or other signals that may be communicated between WAN 26 and PCs 24. In particular embodiments, data switch 16 may be any type of switch providing DSL service (DSL switch), such as a very high speed DSL (VDSL) switch.

Crossbar switch 12 includes input ports 14 coupled to data switch 16 and output ports 18 coupled to CPE devices 20. Crossbar switch 12 enables subscribers of subscriber community 22 to access data services through output ports 18. Crossbar switch 12 has a greater number of output ports 18 than input ports 14 since it may not be economical to provision a data port for each potential subscriber. In the illustrated embodiment, crossbar switch 12 includes four input ports 14 and twelve output ports 18, but other embodiments of the present invention may include a crossbar switch having any number of input ports 14 and output ports 18. For example, particular embodiments may include a crossbar switch having twenty-four input ports and ninety-six output ports, while other embodiments may include a crossbar switch having sixteen input ports and sixty-four output ports.

Each input port 14 may be coupled internally within crossbar switch 12 to all or less than all output ports 18. If each input port 14 is coupled to each output port 18, then crossbar switch 12 is a "full" crossbar switch. If an input port 14 is coupled to less than all output ports 18, then crossbar switch 12 is a "partial" crossbar switch. A partial crossbar switch may save manufacturing time and costs since the switch will not require technology to couple each input port to each output port.

Since crossbar switch 12 is a "solid-state" crossbar switch, it uses silicon transistor technology. Therefore, its switching time may be faster and its working life may be longer than that of mechanical, relay-based switches. For example, the switching time of crossbar switch 12 may be approximately one switch per millisecond.

Figure 2:
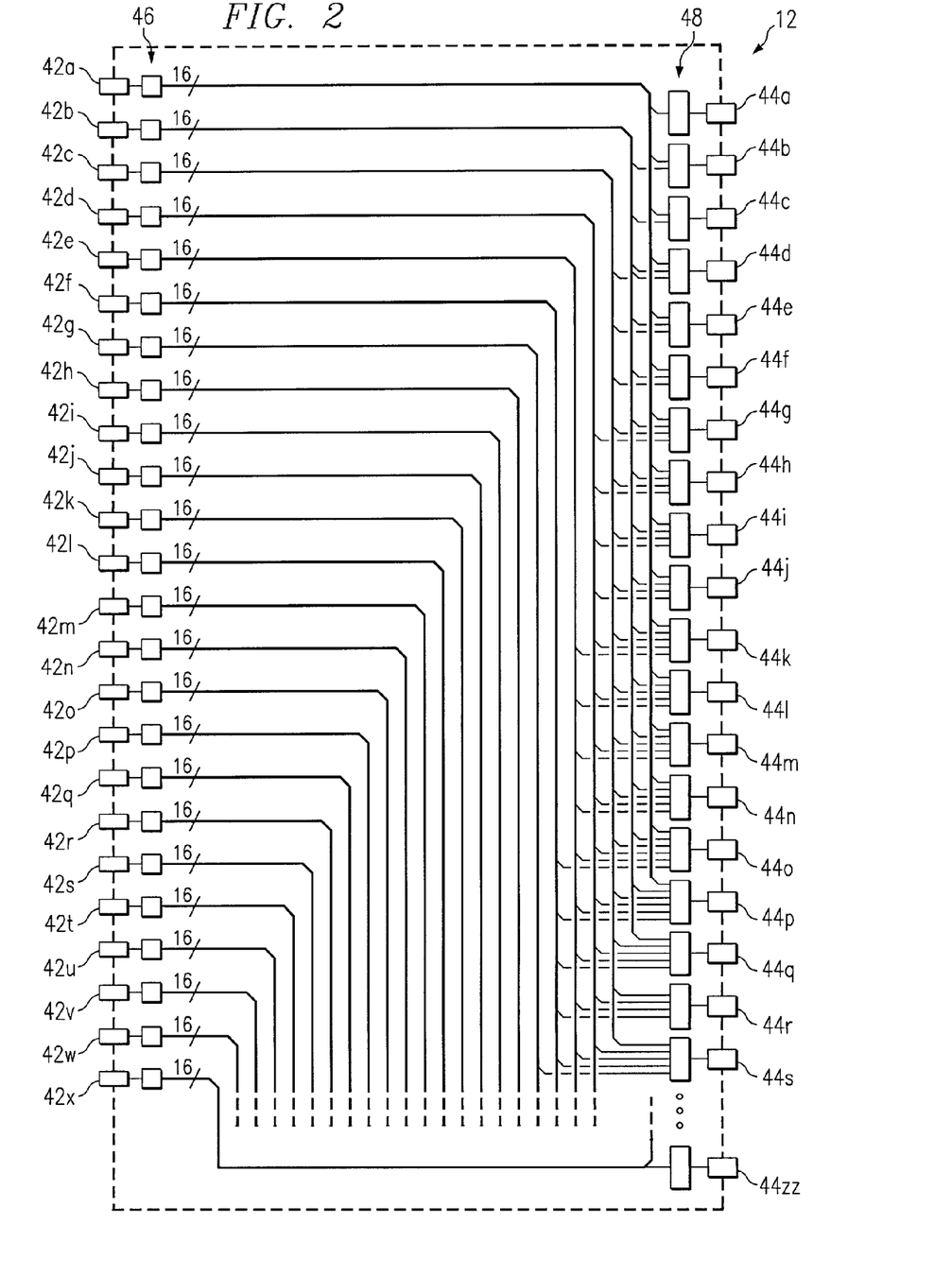
FIG. 2 illustrates a solid-state crossbar switch, in accordance with an embodiment of the present invention.

FIG. 2 illustrates a crossbar switch 40 in accordance with a particular embodiment of the present invention. Crossbar switch 40 includes x number of input ports 42, and zz number of output ports 44. Each input port 42 is coupled to a 1×16 bi-directional analog switch 46, which has one inlet and sixteen outlets. A 1×16 analog switch is operable to couple bi-directional data traffic through its inlet and switch the data traffic to any one of its sixteen outlets. Each 1×16 analog switch may be a solid-state analog switch.

Input ports of a crossbar switch in other embodiments may be coupled to other types of analog switches, such as 1×N analog switches where N may be a number other than sixteen. For example, in other embodiments 1×12, 1×24 or 1×32 analog switches may be used. Analog switches with different N values may also be used in a single crossbar switch in particular embodiments. The decision regarding which types of analog switches to use in a particular embodiment may be made with a view towards reducing expenses and improving the provision of data services through the crossbar switch. Furthermore, some embodiments may include input ports not coupled to an analog switch.

In the illustrated embodiment, some analog switches 46 are coupled to a combiner 48. Each combiner 48 is coupled to an output port 44 of crossbar switch 40. Each combiner 48 may have varying numbers of inputs coupled to a number of analog switches 46 and one output coupled to an output port 44. Each combiner 48 is operable to couple bi-directional data traffic through any of its inputs.

Each analog switch 46 is coupled to either a combiner 48 or directly to an output port 44. Each combiner 48 is coupled to an output port 44 of crossbar switch 40. Thus, through the use of analog switches 46 and combiners 48, each input port 42 of crossbar switch 40 is coupled to sixteen output ports 44, and each output port 44 is coupled to at least one input port 42.

As illustrated and described above with regard to crossbar switch 12, input ports 14 and output ports 18, all of FIG. 1, input ports 42 may be coupled to a data switch in order to provide data services from a WAN. Furthermore, output ports 44 may be coupled to CPE devices so that subscribers may access the WAN through PCs or other devices connected to the CPE devices.

Data traffic received at input port 42a may be transmitted to any one of output ports 44a, 44b, 44c, 44d, 44e, 44f, 44g, 44h, 44i, 44j, 44k, 44l, 44m, 44n, 44o and 44p (such group of output ports also referred to as 44a–44p). Similarly, as illustrated, data traffic received at input port 42b may be transmitted to any one of output ports 44b–44q. Furthermore, as illustrated, data traffic received at input port 42c may be transmitted to any one of output ports 44d–44s.

As an example, crossbar switch 12 may be used in the provision of internet service to homes of a subscriber community. Each input port 42 may be coupled to a DSLAM, and each output port 44 may be coupled to a home of the subscriber community. It may be very expensive to couple the DSLAM to all subscriber homes so that each home may be able to access internet service through the DSLAM at one time. Furthermore, it may be assumed that all homes in the subscriber community may not request internet service, and an internet service provider may not know which homes will and which homes will not request such service. Therefore, crossbar switch 12 may be used because it provides a way for each home to access the DSLAM while avoiding the expense of coupling the DSLAM to each subscriber home in such a manner to allow each home to access internet service through the DSLAM at one time. Crossbar switch 12 also reduces the need for a technician to be sent out to make a manual connection between the DSLAM and a home each time a subscriber desires internet service (such sending out of a technician otherwise referred to as "truck roll").

In operation, a subscriber in a subscriber community may desire to access internet service through a DSLAM coupled to a WAN using a PC and a CPE device coupled to output port 44a. Since output port 44a is coupled to input port 42a and 42b, crossbar switch 40 may then establish an active connection whereby data traffic flows between input port 42a or 42b and output port 44a. As an example, assume an active connection is established between input port 42a and output port 44b.

Another subscriber from the same subscriber community may desire to access internet service through a DSLAM coupled to a WAN using a PC and a CPE device coupled to output port 44c. Output port 44c is coupled to input port 42a and 42b. Since an active connection is already established with input port 42a (and output port 42b), crossbar switch 40 would establish an active connection between input port 42b and output port 44c. Thus, crossbar switch 40 may establish an active connection, providing for the flow of data traffic, between any input port 42 and output port 44 coupled together which are not part of an established active connection.

Figure 3A:
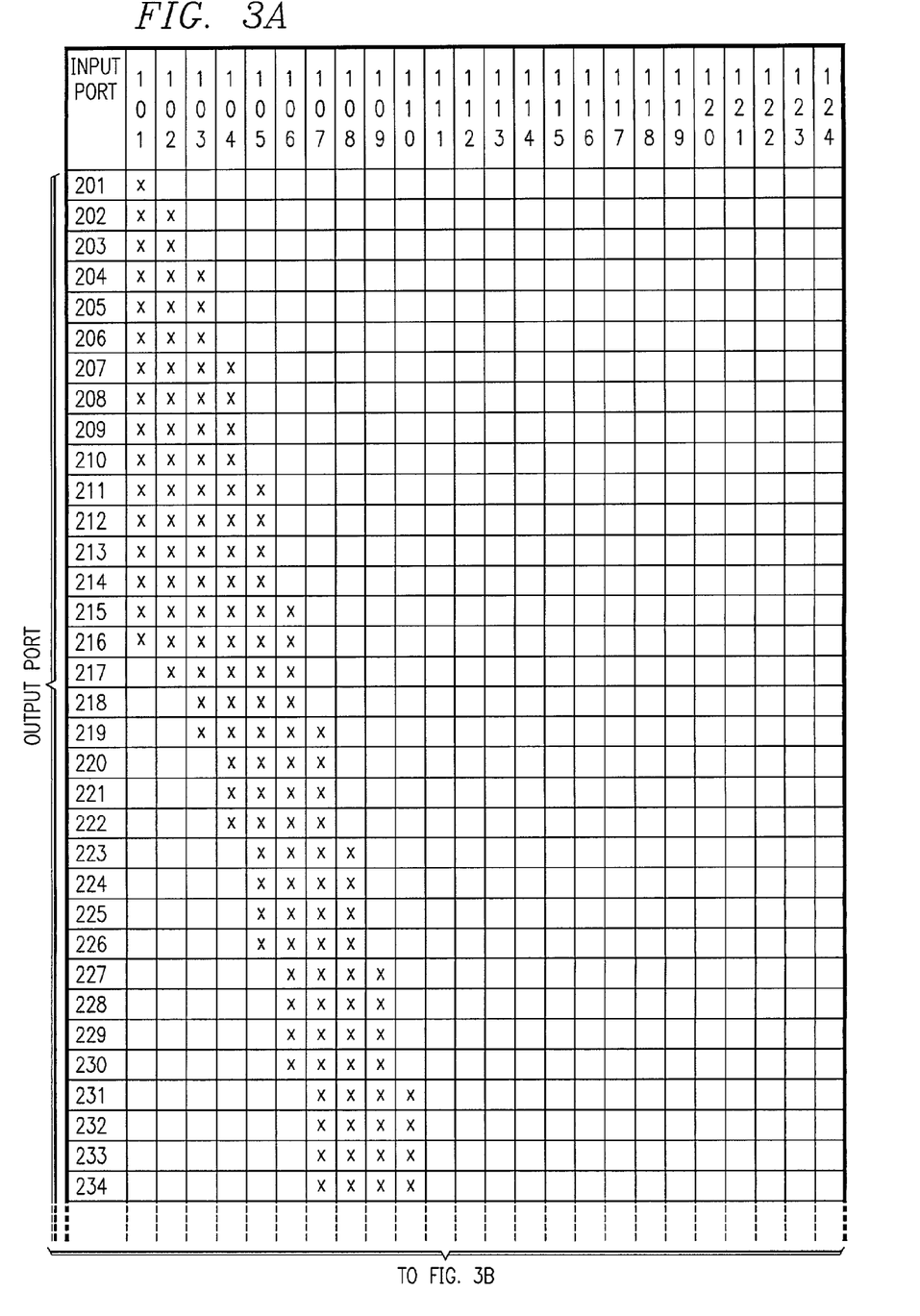
FIG. 3 illustrates a coupling table of a crossbar switch, in accordance with an embodiment of the present invention.
Figure 3B:
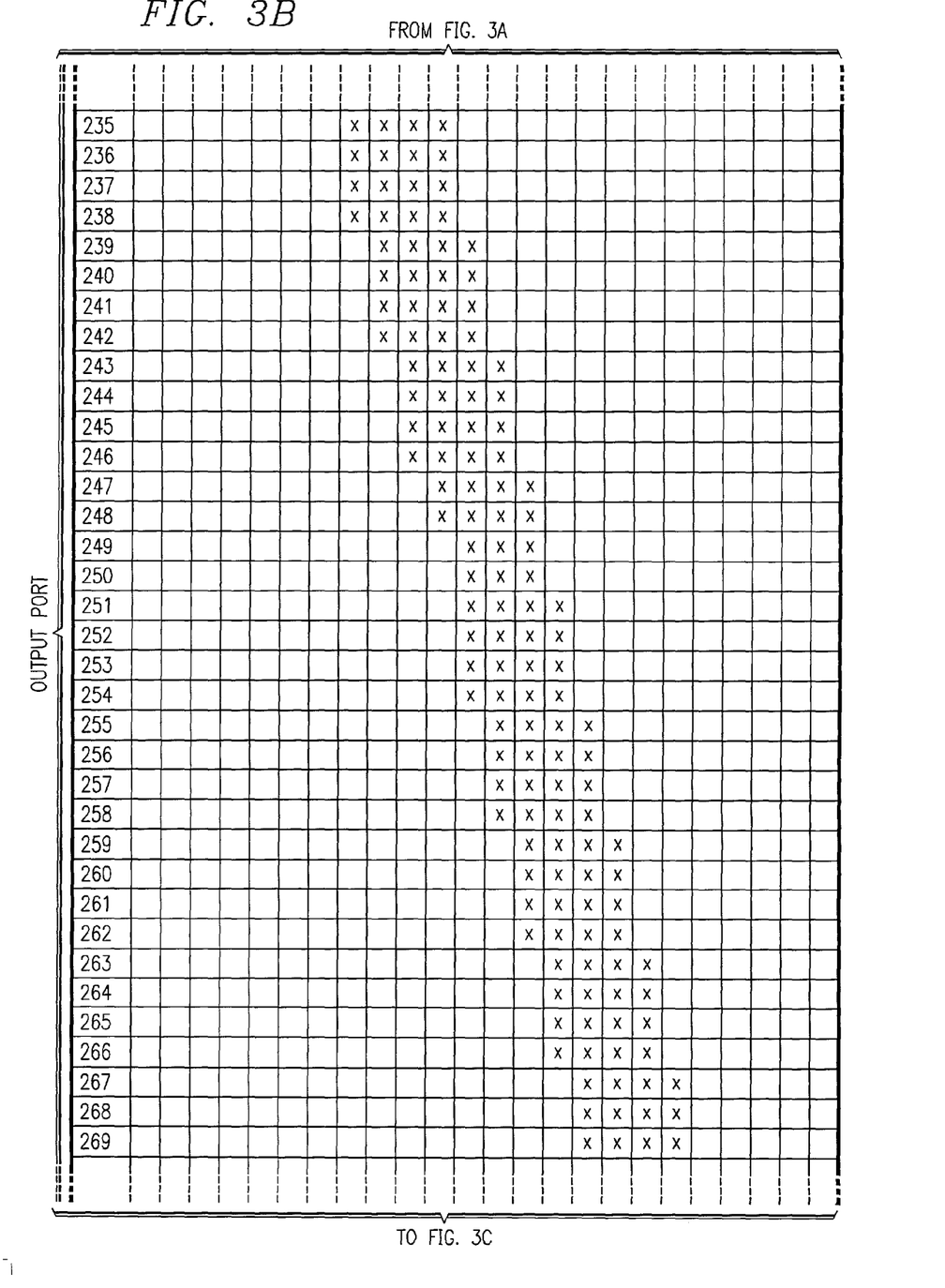
Figure 3C:
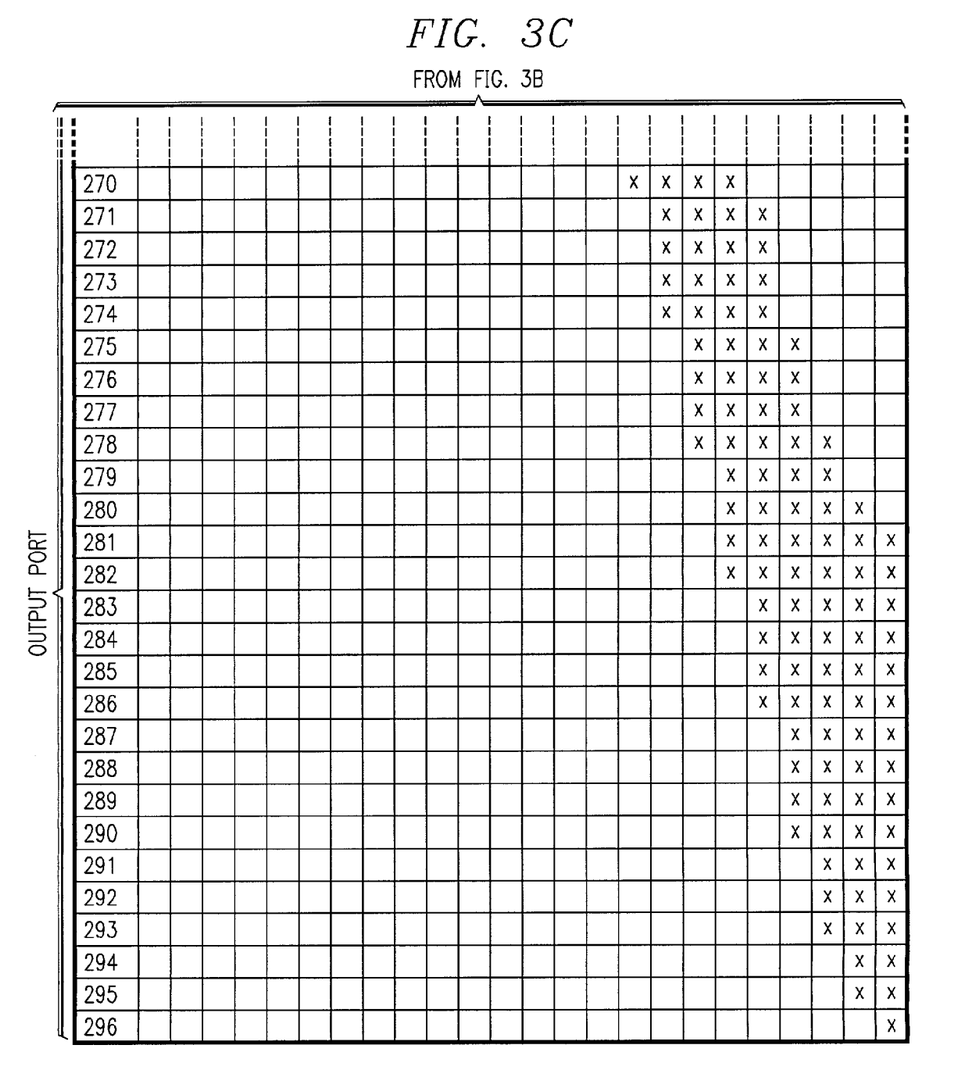

FIG. 3 illustrates a coupling table showing couplings between input ports 101–124 and output ports 201–296 of a crossbar switch having twenty-four input ports and ninety-six output ports, in accordance with an embodiment of the present invention. In the coupling table, each input port 101–124 is represented with its own column, and each output port 201–296 is represented with its own row. A coupling between a particular input port and a particular output port is indicated with an "x" in the box where such input port's column and such output port's row intersect. For example, the table indicates that input port 105 is coupled to output ports 211–226. As illustrated, each input port is coupled to sixteen output ports. Furthermore, each output port is coupled to between one and six input ports.

In operation, the crossbar switch illustrated through the coupling table with input ports 101–124 and output ports 201–296 works much like crossbar switch 40 of FIG. 2. As an example, a subscriber may desire to access a WAN through a PC and a CPE device coupled to output port 239. Assume, for this example, that input ports 109 and 110 are already part of an established active connection involving other output ports (for example, output ports 231 and 232, respectively). The crossbar switch would then establish an active connection between output port 239 and either input port 111 or 112. If crossbar switch established such a connection between output port 239 and input port 112, then input port 111 would still be available for an active connection to be established with any one of output ports 235–238 or 240–248.

Figure 4A:
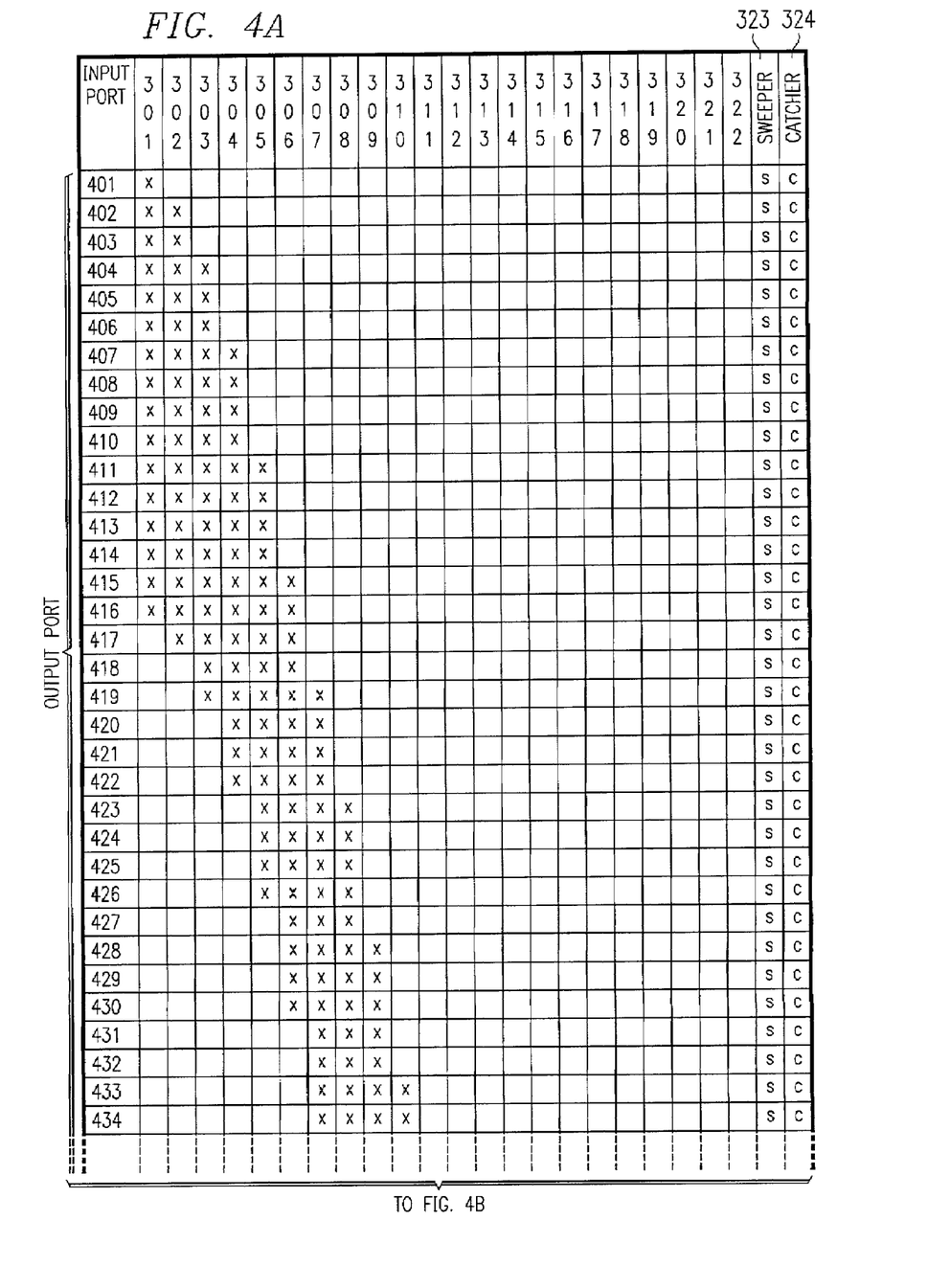
FIG. 4 illustrates a coupling table of a crossbar switch with a sweeper port and a catcher port, in accordance with an embodiment of the present invention.
Figure 4B:
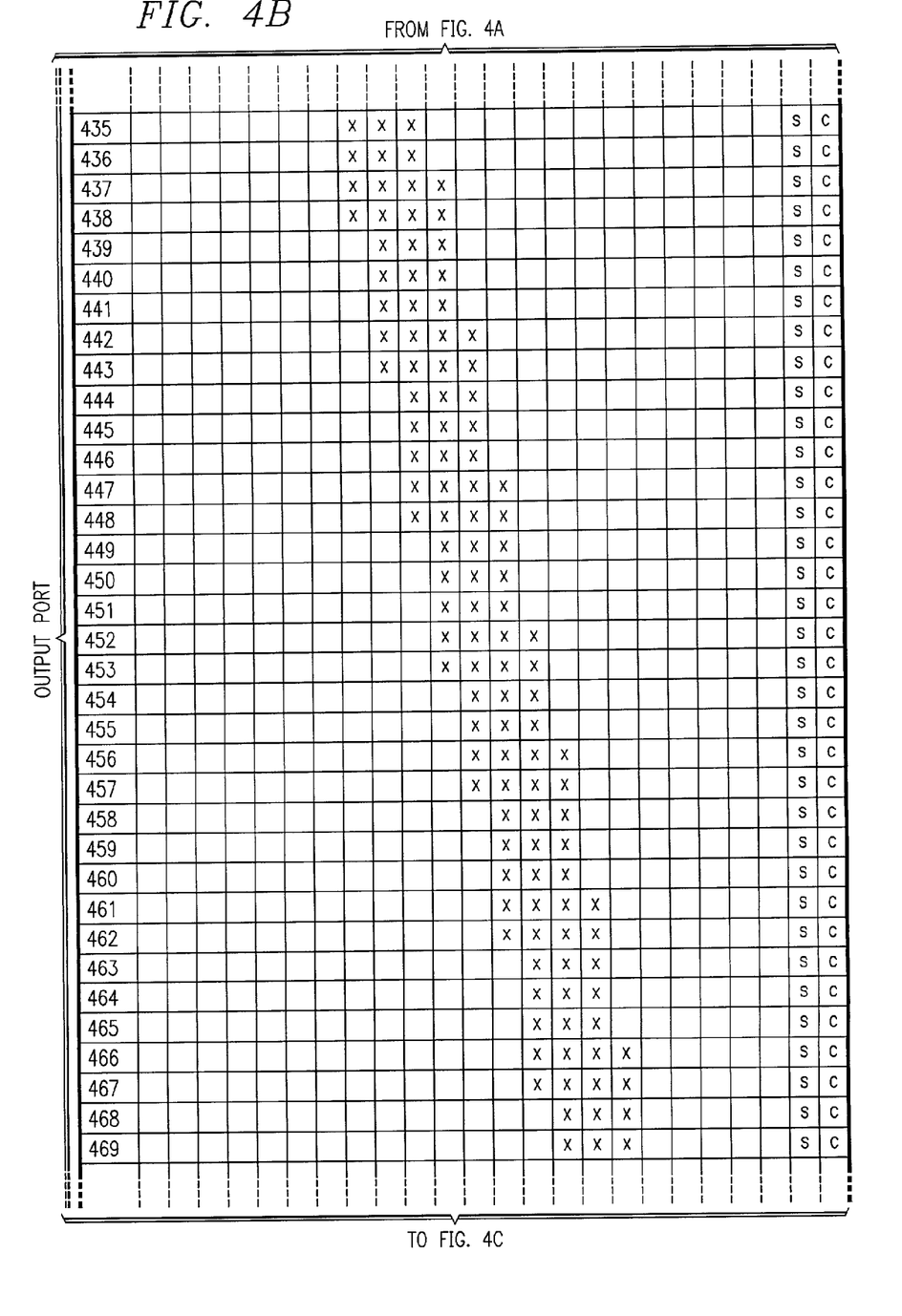
Figure 4C:
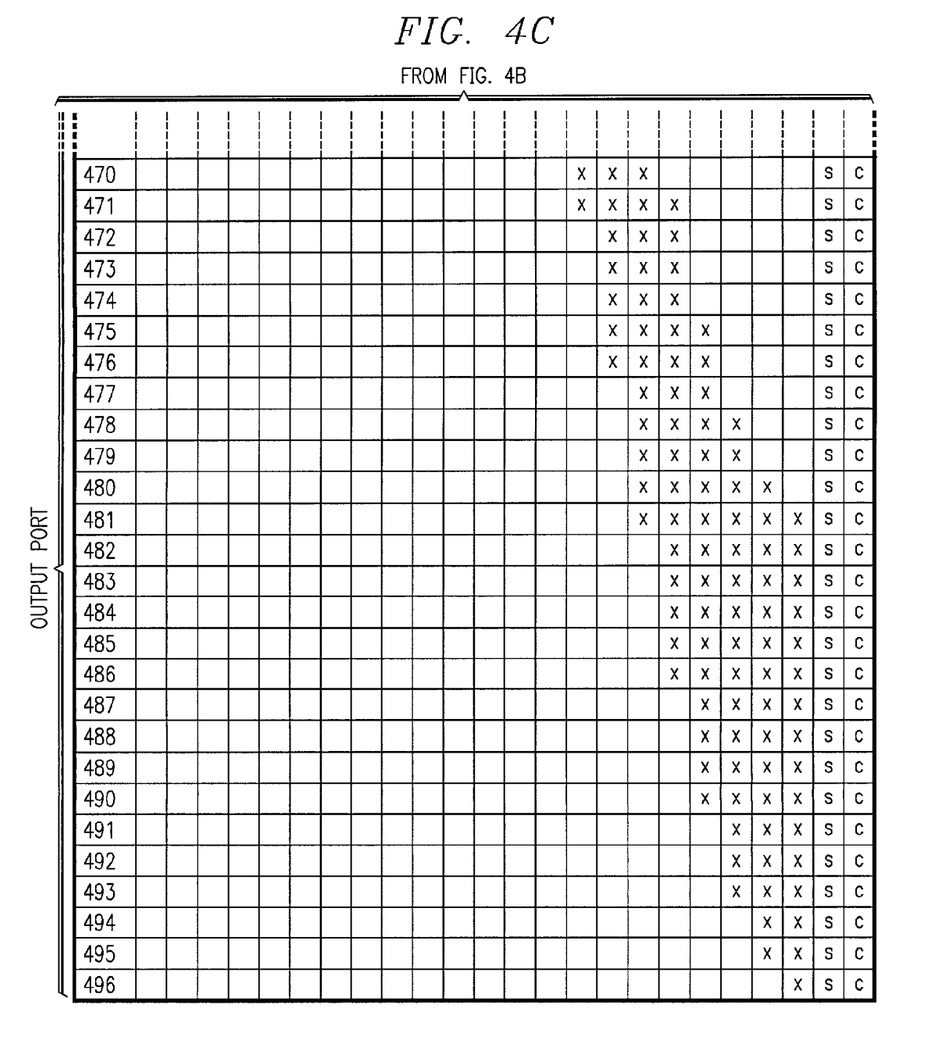

FIG. 4 illustrates a coupling table showing couplings between input ports 301–322, a sweeper port 323 and a catcher port 324 and output ports 401–496 of a solid-state crossbar switch, in accordance with an embodiment of the present invention. In this embodiment, input ports 301–322 are each coupled to sixteen output ports. Sweeper port 323 is coupled to each output port 401–496, and catcher port 324 is coupled to each output port 401–496.

Sweeper port 323 fulfills a self-provisioning function of the crossbar. Sweeper port 323 continuously cycles through each available output port, establishing an active connection for a period of time (for example, a few milliseconds) with each such output port. An available output port is one that is not currently a part of an active connection with an input port. The purpose of this continuous cycling is to detect when a new subscriber, one that does not already have a subscription established with the WAN, connects with one of the output ports.

When sweeper port 323 detects a new subscriber connected to an output port through a CPE device, sweeper port 323 makes an active connection with that output port. The crossbar switch then reconfigures that active connection, establishing an active connection between the same output port and an input port other than sweeper port 323 (for example, one of input ports 301–322). After this active connection is established, sweeper port 323 may return to its continuous cycling through available output ports looking for new subscribers. The self-provisioning function of sweeper port 323 can save labor time and expense because it prevents truck roll when a new subscriber desires to receive the data service.

Catcher port 324 helps to alleviate bad clusters in the crossbar switch. A bad cluster arises when there are no available input ports coupled to a particular output port through which a subscriber is trying to access a WAN.

For example, assume that input port 308 is presently part of an active connection with output port 432, input port 309 is presently part of an active connection with output port 433 and input port 310 is presently part of an active connection with output port 434. If a subscriber connected to output port 435 desires to access a WAN through the crossbar switch, there are no available input ports with which to make the connection, since input ports 308, 309 and 310 are presently part of an active connection. However, since catcher port 324 is coupled to each output port, catcher port 324 can form an active connection with output port 435. In this manner, catcher port 324 helps to alleviate bad clusters in the crossbar switch.

Catcher port 324 may continuously cycle through each available output port, establishing an active connection for a period of time (for example, a few milliseconds) with each such output port, much like sweeper port 323 does in order detect a subscriber trying to access an output port with no available coupled input port. When a bad cluster arises and catcher port 324 forms an active connection with an output port to alleviate the bad cluster, the crossbar switch may alert technical support so that the couplings between the input ports and the output ports may be modified to reduce the chances of a bad cluster occurring in the future. The ability of catcher port 324 to alleviate the occurrence of bad clusters may allow a partial crossbar switch having input ports coupled to a reduced number of output ports to be utilized. Accordingly, time and expenses associated with manufacturing the crossbar switch may be reduced. Furthermore, labor time and expense may be reduced since it may not be necessary for manual service to be provided each time a bad cluster situation arises.

It should be understood that FIGS. 2, 3 and 4 illustrate example configurations of how input ports and output ports of crossbar switches in accordance with particular embodiments of the present invention may be coupled. Such example configurations were determined with a view towards reducing the chances of the occurrence of a bad cluster. Other embodiments of the present invention may include a crossbar switch with input ports and output ports coupled in ways other than as described in FIGS. 2, 3 and 4. Varying the manner in which input ports and output ports of a crossbar switch are coupled may include using different types of 1×N analog switches, such as 1×12, 1×24 or 1×32 analog switches or a 1×N analog switch where N is between 12 and 32. Using such analog switches may reduce expenses associated with manufacturing a crossbar switch in accordance with an embodiment of the present invention and may reduce the chances of a bad cluster occurrence. Various other ways of coupling input ports and output ports may be determined, for example, by statistical analysis to reduce the chances of a bad cluster occurring or in view of a particular subscriber community being serviced.

Figure 5:
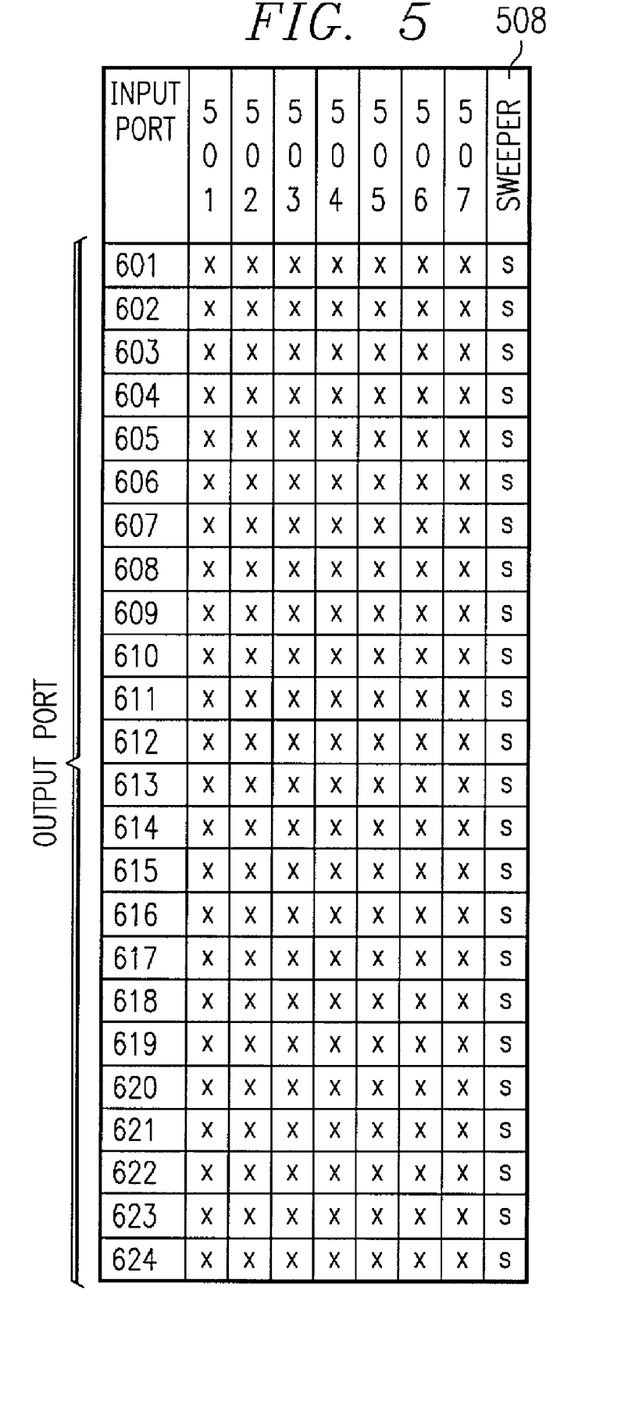
FIG. 5 illustrates a coupling table of a full crossbar switch with a sweeper port, in accordance with an embodiment of the present invention.

FIG. 5 illustrates a coupling table showing couplings between input ports 501–507 and a sweeper port 508 and output ports 601–624 of a solid state crossbar switch, in accordance with an embodiment of the present invention. In this embodiment, the coupling table illustrates couplings of a full crossbar switch. As stated above, a full crossbar switch is one in which each input port is coupled to each output port of the crossbar switch.

Since each input port 501–507 is coupled to each output port 601–624, the full crossbar switch may establish an active connection between any input port 501–507 and any output port 601–624. This alleviates the possibility that a bad cluster may arise since a subscriber will have access to each input port through any output port.

Sweeper port 508 operates in a similar manner as sweeper port 323 of FIG. 4. Sweeper port 508 continuously cycles through each available output port, establishing an active connection for a period of time with each such output port. Thus, sweeper port is able to detect when a new subscriber connects with one of the output ports.

A full crossbar switch may include 1×N analog switches coupled to each input port to couple each input port to each output port. In such cases, the crossbar switch with the 1×N analog switches coupled to each input port may contain N number of output ports. For example, the crossbar switch whose couplings are illustrated in FIG. 5 may include 1×24 analog switches coupled to each input port 501–507 and sweeper port 508. In this case, each 1×24 analog switch would be coupled to each output port 601–624.

The coupling table of FIG. 5 illustrates a full crossbar switch having seven input ports, a sweeper port and twenty-four output ports. Other embodiments may include a full crossbar switch having other numbers of input ports, sweeper ports and output ports. For example, particular embodiments may include a full crossbar switch having twenty-four input ports and ninety-six output ports.

Some embodiments of the present invention may include a crossbar switch with only one of a sweeper port or a catcher port. Other embodiments may include a crossbar switch having multiple sweeper ports and/or catcher ports.

Although the present invention has been described in detail, various changes and modifications may be suggested to one skilled in the art. It is intended that the present invention encompass such changes and modifications as falling within the scope of the appended claims.

What is claimed is:

1. A solid-state crossbar switch for transmitting data traffic, comprising:
   a first number of input ports, each input port operable to receive DSL data from a data switch;
   a second number of output ports, each output port capable of being coupled to a customer premise equipment (CPE) device;
   a third number of 1×N solid-state analog switches, each 1×N solid-state analog switch operable to couple one of the input ports with N output ports; and
   a catcher port coupled to each output port, wherein the catcher port is operable to monitor each output port to detect an active connection of a CPE device to one of the output ports and form an active connection with one of the output ports to alleviate a bad cluster.

2. The crossbar switch of claim 1, wherein each input port is coupled to one of the 1×N solid-state analog switches.

3. The crossbar switch of claim 1, wherein the second number of output ports is greater than N.

4. The crossbar switch of claim 1, further comprising a sweeper port coupled to each output port, wherein the sweeper port is operable to monitor each output port to detect an active connection of a CPE device to one of the output ports.

5. The crossbar switch of claim 4, wherein the first number is twenty-three.

6. The crossbar switch of claim 1, wherein the first number is twenty-two.

7. The crossbar switch of claim 1, wherein the first number is twenty-three.

8. The crossbar switch of claim 1, wherein the first number is twenty-four.

9. The crossbar switch of claim 1, wherein the second number is ninety-six.

10. The crossbar switch of claim 1, wherein N is approximately between twelve and thirty-two.

11. The crossbar switch of claim 1, wherein N is sixteen.

12. The crossbar switch of claim 1, wherein N is twenty-four.

13. The crossbar switch of claim 1, further comprising a sweeper port coupled to each output port, wherein the sweeper port is operable to continuously cycle through each output port, establishing an active connection for a period of time to detect an active connection of a CPE device to one of the output ports.

14. A solid-state crossbar switch for transmitting data traffic, comprising:
   a first number of input ports, each input port operable to receive DSL data from a data switch;
   a second number of output ports, each output port capable of being coupled to a customer premise equipment (CPE) device;
   a first number of solid-state analog switches, each solid-state analog switch operable to couple one of the input ports with each output port; and
   a sweeper port coupled to each output port, wherein the sweeper port is operable to monitor each output port to detect an active connection of a CPE device to one of the output ports.

15. The crossbar switch of claim 14, wherein the first number is twenty-three.

16. The crossbar switch of claim 14, wherein the second number is ninety-six.

17. A method for transmitting DSL data between a data switch and a CPE device using a solid-state crossbar switch, comprising:
   receiving DSL data from the data switch at a first number of input ports;
   receiving the DSL data from the input ports at a second number of 1×N solid-state analog switches, wherein each 1×N solid-state analog switch comprises N outlets;
   switching the DSL data received at each analog switch to an outlet of each analog switch;
   receiving the switched DSL data at a third number of output ports, each output port capable of being coupled to a CPE device; and
   monitoring each output port to detect an active connection of a CPE device to one of the output ports using a sweeper port, wherein the sweeper port is coupled to each output port.

18. The method of claim 17, wherein each input port is coupled to one of the analog switches.

19. The method of claim 17, wherein the third number of output ports is greater than N.

20. The method of claim 17, wherein the first number is twenty-four.

21. The method of claim 17, wherein the third number is ninety-six.

22. The method of claim 17, wherein N is approximately between twelve and thirty-two.

23. The method of claim 17, wherein the first number is twenty-three.

24. The method of claim 17, wherein the first number is twenty-two.

25. The method of claim 17, further comprising monitoring each output port to detect an active connection of a CPE device to one of the output ports and forming an active connection with one of the output ports to alleviate a bad cluster using a catcher port, wherein the catcher port is coupled to each output port.

26. The method of claim 25, wherein the first number is twenty-three.

27. The method of claim 17, wherein the sweeper port continuously cycles through each output port, establishing an active connection for a period of time to detect an active connection of a CPE device to one of the output ports.

28. An apparatus for transmitting DSL data between a data switch and a CPE device using a solid-state crossbar switch, comprising:
   means for receiving DSL data from the data switch at a first number of input ports;

means for receiving the DSL data from the input ports at a second number of 1×N solid-state analog switches, wherein each 1×N solid-state analog switch comprises N outlets;

means for switching the DSL data received at each analog switch to an outlet of each analog switch;

means for receiving the switched DSL data at a third number of output ports, each output port capable of being coupled to a CPE device; and means for monitoring each output port to detect an active connection of a CPE device to one of the output ports using a sweeper port wherein the sweeper port is coupled to each output port.

29. The apparatus of claim 28, further comprising means for monitoring each output port to detect an active connection of a CPE device to one of the output ports and means for forming an active connection with one of the output ports to alleviate a bad cluster using a catcher port, wherein the catcher port is coupled to each output port.

30. A program encoded in a computer readable medium for transmitting DSL data between a data switch and a CPE device using a solid-state crossbar switch, the program, when executed, performing the following steps:

receive DSL data from the data switch at a first number of input ports;

receive the DSL data from the input ports at a second number of 1×N solid-state analog switches, wherein each 1×N solid-state analog switch comprises N outlets;

switch the DSL data received at each analog switch to an outlet of each analog switch;

receive the switched DSL data at a third number of output ports, each output port capable of being coupled to a CPE device; and monitor each output port to detect an active connection of a CPE device to one of the output ports using a sweeper port, wherein the sweeper port is coupled to each output port.

31. The program encoded in a computer readable medium of claim 30, wherein the program, when executed, is further operable to monitor each output port to detect an active connection of a CPE device to one of the output ports and form an active connection with one of the output ports to alleviate a bad cluster using a catcher port, wherein the catcher port is coupled to each output port.

32. A crossbar switch for transmitting data traffic, comprising:

a first number of input ports, each input port operable to receive data from a data switch;

a second number of output ports, each output port capable of being coupled to a customer premise equipment (CPE) device;

a third number of 1×N analog switches, each 1×N analog switch operable to couple one of the input ports with N output ports, wherein N is less than the second number; and a sweeper port coupled to each output port, wherein the sweeper port is operable to monitor each output port to detect an active connection of a CPE device to one of the output ports.

33. The crossbar switch of claim 32, wherein the first number is twenty-four.

34. The crossbar switch of claim 32, wherein the second number is ninety-six.

35. The crossbar switch of claim 32, wherein N is sixteen.

36. A method for transmitting data between a data switch and a CPE device using a crossbar switch, comprising:

receiving data from the data switch at a first number of input ports;

receiving the data from the input ports at a second number of 1×N analog switches, wherein each 1×N analog switch comprises N outlets;

switching the data received at each analog switch to an outlet of each analog switch;

receiving the switched data at a third number of output ports, each output port capable of being coupled to a CPE device, wherein the third number is greater than N; and monitoring each output port to detect an active connection of a CPE device to one of the output ports using a sweeper port, wherein the sweeper port is coupled to each output port.

37. The method of claim 36, wherein the first number is twenty-four.

38. The method of claim 36, wherein the third number is ninety-six.

39. The method of claim 36, wherein N is sixteen.

40. An apparatus for transmitting data between a data switch and a CPE device using a crossbar switch, comprising:

means for receiving data from the data switch at a first number of input ports;

means for receiving the data from the input ports at a second number of 1×N analog switches, wherein each 1×N analog switch comprises N outlets;

means for switching the data received at each analog switch to an outlet of each analog switch;

means for receiving the switched data at a third number of output ports, each output port capable of being coupled to a CPE device, wherein the third number is greater than N; and means for monitoring each output port to detect an active connection of a CPE device to one of the output ports using a sweeper port, wherein the sweeper port is coupled to each output port.

41. A program encoded in a computer readable medium for transmitting data between a data switch and a CPE device using a crossbar switch, the program, when executed, performing the following steps:

receive data from the data switch at a first number of input ports;

receive the data from the input ports at a second number of 1×N analog switches, wherein each 1×N analog switch comprises N outlets;

switch the data received at each analog switch to an outlet of each analog switch;

receive the switched data at a third number of output ports, each output port capable of being coupled to a CPE device, wherein the third number is greater than N; and monitor each output port to detect an active connection of a CPE device to one of the output ports using a sweeper port, wherein the sweeper port is coupled to each output port.

42. A solid-state crossbar switch for transmitting DSL data traffic, comprising:

twenty-two input ports, each input port operable to receive DSL data from a data switch;

ninety-six output ports, each output port capable of being coupled to a CPE device; and twenty-four 1×16 solid-state analog switches, each 1×16 solid-state analog switch operable to couple one of the input ports with sixteen output ports.

43. The crossbar switch of claim 42, further comprising a sweeper port coupled to each output port, wherein the sweeper port is operable to monitor each output port to detect an active connection of a CPE device to one of the output ports.

44. The crossbar switch of claim 42, further comprising a catcher port coupled to each output port, wherein the catcher port is operable to monitor each output port to detect an active connection of a CPE device to one of the output ports and form an active connection with one of the output ports to alleviate a bad cluster.

45. The crossbar switch of claim 44, further comprising a sweeper port coupled to each output port, wherein the sweeper port is operable to monitor each output port to detect an active connection of a CPE device to one of the output ports.

46. A method for transmitting DSL data between a data switch and a CPE device using a solid-state crossbar switch, comprising:

receiving DSL data from the data switch at a first number of input ports;

receiving the DSL data from the input ports at a second number of 1×N solid-state analog switches, wherein each 1×N solid-state analog switch comprises N outlets;

switching the DSL data received at each analog switch to an outlet of each analog switch; and     receiving the switched DSL data at a third number of output ports, each output port capable of being coupled to a CPE device; and     monitoring each output port to detect an active connection of a CPE device to one of the output ports and forming an active connection with one of the output ports to alleviate a bad cluster using a catcher port, wherein the catcher port is coupled to each output port.

* * * * *